United States Patent [19]

Marcilly et al.

[11] Patent Number: 4,923,593
[45] Date of Patent: May 8, 1990

[54] CRACKING CATALYST AND CATALYTIC CRACKING PROCESS

[75] Inventors: Christian Marcilly, Houilles; Jean-Marie Deves, Rueil Malmaison; Michel Bourgogne, Sainte Adresse, all of France

[73] Assignee: Institut Francais du Petrole, Rueil-Malmaison, France

[21] Appl. No.: 299,167

[22] Filed: Jan. 19, 1989

[30] Foreign Application Priority Data

Jan. 21, 1988 [FR] France ............................... 88 00763
Mar. 4, 1988 [FR] France ............................... 88 02903

[51] Int. Cl.$^5$ ............................................ C10G 11/18
[52] U.S. Cl. ....................................... 208/113; 208/78; 208/120
[58] Field of Search .......................... 208/120, 113, 78

[56] References Cited

U.S. PATENT DOCUMENTS

| 2,994,659 | 8/1961 | Slyngstad et al. | 208/113 |
|---|---|---|---|
| 3,706,654 | 12/1972 | Bryson et al. | 208/74 |
| 3,894,932 | 7/1975 | Owen | 208/120 |
| 3,925,195 | 12/1975 | Scherzer et al. | 208/135 |
| 4,108,795 | 8/1978 | Hemler et al. | 208/120 |
| 4,239,654 | 12/1980 | Gladrow et al. | 208/420 |
| 4,242,237 | 12/1980 | Gladrow et al. | 208/120 |
| 4,287,048 | 9/1981 | Gladrow et al. | 208/135 |
| 4,289,606 | 9/1981 | Gladrow et al. | 208/120 |
| 4,339,353 | 7/1982 | Weisz et al. | 208/120 |
| 4,405,445 | 9/1983 | Kovach et al. | 208/113 |
| 4,435,279 | 3/1984 | Busch et al. | 208/120 |
| 4,450,241 | 5/1984 | Hettinger et al. | 208/120 |
| 4,738,941 | 4/1988 | Dufresne et al. | 502/66 |
| 4,764,268 | 8/1988 | Lane | 208/113 |
| 4,780,195 | 10/1988 | Miller | 208/120 |
| 4,784,750 | 11/1988 | Dufresne et al. | 208/120 |

FOREIGN PATENT DOCUMENTS 0190949 8/1986 European Pat. Off. ............. 502/64

OTHER PUBLICATIONS

H. P. Klug and L. E. Alexander, X-Ray Diffraction Procedures for Polycrystalline and Amorphous Materials, 1954, pp. 14–47.

*Primary Examiner*—Anthony McFarlane
*Attorney, Agent, or Firm*—Millen, White & Zelano

[57] ABSTRACT

The invention concerns a fluidized bed cracking process of a hydrocarbon charge, carried out in an extended, appreciably tubular and vertical reaction zone (1), the catalyst being introduced at the lower end of this extended zone by a piper (2), and the charge being introduced by at least one pipe (3) opening into the reaction zone at a level higher than the level at which the catalyst is admitted.

The invention wherein, for example, part of the gasoline or part (3a) to an intermediate point between the catalyst and charge entry points, and wherein a specially adapted catalyst is used for this operating procedure. The invention also concerns the catalyst used in this way, a zeolite-based catalyst of the erionite family.

7 Claims, 1 Drawing Sheet

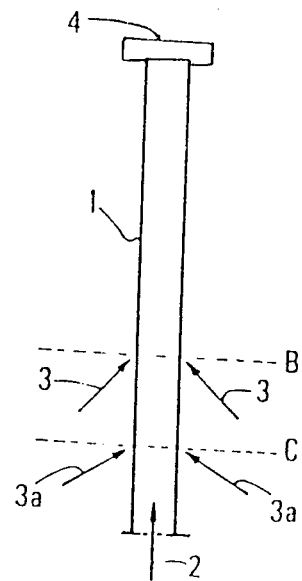

CRACKING CATALYST AND CATALYTIC CRACKING PROCESS

The present invention falls within the scope of fluid catalytic cracking of hydrocarbon charges.

Cracking processes in which hydrocarbons with high molecular weights and boiling points are split up into smaller molecules which boil in lower temperature range, appropriate to a particular intended use are widely used in the petroleum industry.

The process most commonly used to this end, at present, is the process known as fluid catalytic cracking (FCC). In this type of process, the hydrocarbon charge is vaporized by contacting it with a cracking catalyst at a high temperature, the latter being kept in suspension in the vapors of the charge. After the molecular range desired has been obtained by cracking, with a corresponding decrease in boiling points, the catalyst is separated from the products obtained, stripped, regenerated by combustion of the coke formed, then recontacted with the charge to be cracked.

In new FCC processes, two regeneration zones can be used through which the catalyst used circulates.

The charges to be cracked are usually injected into the reaction zone at a temperature generally between 480° and 540° C., under a relative pressure of 0.7 to 3.5 bar, whereas the temperature of the regenerated catalyst which arrives in this zone can be in the order of 600° to 950° C.

In the process according to the invention, the catalyst is introduced either at the base or at the top of a tubular, vertical zone, serving as a reaction zone. This type of zone functions either as a riser or a dropper. The catalyst is introduced in a quantity determined, for example, by the opening or shutting of a valve. The catalyst grains are then accelerated towards the top or the base of the tube by injection of a gaseous fluid at the base or the top of this tube. This injection is carried out with a fluid distributor. The charge to be cracked is introduced below and vaporized as completely as possible in the dense flow of catalyst grains, using an appropriate device.

Chambers are fitted at the end of the tube. Separation of the charge cracked, on the one hand, and, on the other hand, stripping of used catalyst and, possibly, its regeneration, are carried out in these chambers.

In the riser version, the catalyst is introduced at the base of the riser in a quantity determined, for example, by the opening or shutting of a valve. The catalyst grains are then packed and accelerated towards the top of the riser by injection of a gaseous fluid at the base of the riser. This injection is carried out with a fluid distributor. The charge to be cracked is introduced at a higher level and at least partially vaporized in the dense flow of catalyst grains, using an appropriate device.

The top of the riser opens into a chamber which is concentric to it for example and in which separation of the cracked charge, on the on hand, and, on the other hand, stripping of used catalyst are carried out. The catalyst is separated from the effluent, carried along by a cyclone system, then scrubbed and purified.

In the dropper version, the catalyst is introduced at the top of the dropper in a quantity determined, for example, by the opening or shutting of a valve. The catalyst grains are then accelerated towards the base of the dropper by injection of a gaseous fluid at the top of the latter.

In the case of double-regeneration systems, such as the commercial process known as "R2R", used catalyst particles are evacuated after stripping towards a first regenerator. In this regenerator, the coke deposited on the catalyst particles is partially burned by air leading to production of CO and $CO_2$. The combustion gas is scrubbed of catalyst, carried along by cyclones then evacuated. Catalyst particles having thus undergone preliminary partial regeneration treatment are then transferred into a second stage in the regenerator, separate from the first. In this regenerator, combustion of the remaining coke to $CO_2$ is carried out with air in excess. The combustion gases are separated from the catalyst, carried along by cyclones then evacuated.

Hydrocarbon charges likely to be injected into units of the type mentioned above can include hydrocarbons having boiling points between 200° and 550° C. or more, and their density can vary from 10° to 35° API. These charges can also be heavy charges containing hydrocarbons with boiling points up to 750° C. and more and whose density can vary from 10° to 35° API, or between 0° and 25° API.

For example, the following can be cited as charges: those with final boiling points in the order of 400° C., such as vacuum gas oils, but also heavier hydrocarbon oils, such as crude and/or stabilized petrols and atmospheric or vacuum distillation residues. If need be, these charges can have undergone preliminary treatment, such as hydrotreatment in the presence of cobalt-molybdenum or nickel-molybdenum type catalysts, for example. The preferred charges of the invention will be those contained in fractions usually boiling at 700° C. and over, which can contain high percentages of asphaltenic products and have a content up to 10% or more. These charges can be diluted or not with conventional lighter cuts which can include hydrocarbon cuts having already undergone cracking and which are recycled such as light cycle oils (L.C.O.) or heavy cycle oils (H.C.O.) for example. According to the preferred procedure of the invention, these charges are available and preheated in temperature region between 300° and 450° C. before being treated.

The present invention accordingly concerns a catalytic cracking process which allows greater flexibility in the composition of products yield to be achieved as well as improvement of the quality of the gasoline cut, i.e., the research and motor octane numbers. In fact, it is sometimes the case that one objective of refining, within the scope of catalytic cracking, is to obtain a maximum of liquefied petroleum gas (C3-C4) (LPG) and to simultaneously obtain either a maximum of gasoline with a high octane number or, more rarely, a maximum of light cycle oil (LCO). In the second case, such a procedure is normally incompatible as it would be necessary to be able to increase the severity of catalytic cracking in order to obtain maximum L.P.G. and to reduce it in order to maximize L.C.O. production.

The present invention allows the above-mentioned objectives to be achieved. To this end, the invention comprises a process which involves mixing straight-run gasoline or gasoline obtained from recycling (conversion gasoline) with at least part of the gasoline obtained in the effluent from the catalytic cracking zone, upstream from the charge. It must be remembered that generally speaking in the field of catalytic cracking, setting up a process particularly depends on the nature of the hydrocarbon effluents the user wishes to obtain, as a function of the refining objectives of that moment.

Thus, catalytic cracking of an oil generally allows the following products to be obtained:
light gasses (hydrogen, hydrocarbons with 1 to 2 carbon atoms per molecule),
propylene,
propene (C3−),
hydrocarabons with 4 carbon atoms per molecule (saturated C4 and iso C4),
unsaturated hydrocarbons with 4 carbon atoms,
gasolines,
a light cycle oil (L.C.O.),
a heavy cycle oil (H.C.O.),
slurry which is usually purified at remaining catalyst in order to obtain a clarified oil (C.O.) or a decanted oil (D.O.).

Some users may want either to appreciably increase production of unsaturated C3 (propylene) without increasing production of C4 hydrocarbons and saturated dry gases (H2, C1, C2), or to appreciably improve production of unsaturated C3 (propylene) and iso C4 without greatly increasing production of saturated dry gases (H2, C1, C2), or to appreciably increase production of unsaturated C3 (propylene) and possibly C4 (particularly unsaturated C4) without increasing production of saturated dry gases (H2, C1, C2). In all three cases, association of the former with maximal production of gasoline of a particularly high octane number is the objective most often aimed at.

It is the two latter possibilities that are sought in the present patent application and which can be obtained by use of a new catalyst specific to catalytic cracking, or by use of an additive added to a conventional catalyst, this additive being defined as the new catalyst specific to catalytic cracking.

SUMMARY OF THE INVENTION

Among the zeolites likely to allow obtaining of a catalyst likely to improve yield in light products with 3 to 4 carbon atoms, propylene in particular, we have surprisingly discovered that zeolites of the erionite family, such as erionite, offretite, ZSM-34 or zeolites consisting of mixed crystals of the latter two zeolites (erionite T for example) possess these properties. They thus allow gasoline with propylene yields and octane numbers that are much higher than those obtained with conventional zeolite cracking catalysts to be obtained, particularly when they are used as additives to these latter. We have further discovered that, among these zeolites of the erionite family, stabilized and dealuminated offretites, characterized by a silica/alumina molar ratio greater than or equal to 15, allow high performance catalysts to be obtained. One of the preferred zeolites of the present invention is stabilized and dealuminated offretite.

It is obtained with modifiying treatments which allow the aluminum and silicon composition of its aluminosilicate framework to be adjusted as desired. Its preparation was described in the European patent application No. EP-A-190949.

Offretite is a natural or synthetic zeolite belonging to the chabazite group. For a long time, its structure was thought to be identical to that of erionite, a zeolite from the same family, because of the similarity of their X-ray diffraction spectra (HEY M. H. & FEJER E. E., Min. Mag. 33, 66, 1962). However, these two structures are different: on the one hand, offretite's hexagonal mesh has a dimension in the direction of the c axis which is half that of erionite's (BENNET J. M. & GARD J. A., Nature 214, 1005, 1967) and thus the unpaired 1 lines present in erionite X-ray diffraction spectra are absent in offretite spectra (GUARD J. A. & TAIT J. M., Molecular Sieve Zeolites-1, Advan. Chem. Ser. 101, 230, 1971); on the other hand, the stacking sequences in the two zeolites are different (WHYTE T. T. Jr., WU E. L., Kerr G. T. & VENUTO P. B., J. Catal. 20, 88, 1971). Offretite thus has a structure that is much more open than that of erionite. Stacking faults may occur in these structures, giving rise to formation of erionite T, which is a zeolite having an offretite structure with erionite-type stacking faults.

The structure of offretite has been described in detail by numerous authors and in European Pat. No. 190,949. This European patent describes the offretite used in the present invention, the methods for its characterization and the preferred methods for its manufacture.

Thus, the catalyst used in the present invention or the additive that can be added to a conventional catalyst contains a mixture of a matrix, a zeolite with an open structure, whose definition will be given below, and a zeolite of the erionite family. A catalyst such as this can be prepared with a number of methods known by the person skilled in the art. It can thus be obtained by simultaneous incorporation of a zeolite of the erionite family and a zeolite with an open structure to the matrix according to conventional methods for preparation of cracking catalysts containing a zeolite. The catalyst can also be obtained from a mechanical mixture of a product comprising a matrix and a zeolite with an open structure (see below for the definition of an open structure), such as Y zeolite, and a product comprising a zeolite of the erionite family, for example the offretite described hereinabove which is a mixture of said zeolite and a matrix for example.

The mixture of matrix-zeolite with an open structure employed in the preparation of the catalyst of the present invention is generally a conventional cracking catalyst according to prior art (for example, a commercial catalyst). The zeolite can be a X, beta, omega, and, more particularly, Y zeolite, notably ultrastable Y zeolites, enriched for example with at least one metal from the rare earths family, or new Y zeolites enriched with silica by chemical treatment, called LZ210 and described notably in U.S. Pat. Nos. 4,503,023 and 4,534,853, EP. Nos. 139,291 and 124,120. The zeolite of the erionite family, an offretite such as that described hereinabove for example, used to manufacture the catalyst according to the invention can thus be considered to be an additive which can be used as such in view of mixing it with a conventional cracking catalyst defined hereinabove, or it can first be incorporated into a matrix, the matrix-offretite (for example) thus constituting the additive which is mixed with a conventional cracking catalyst defined hereinabove, for example, after an appropriate forming, by mechanical mixing of grains containing offretite for example with grains of a conventional cracking catalyst.

BRIEF DESCRIPTION OF THE DRAWING

The disclosed FIGURE depicts a preferred embodiment of the invention.

In the present invention, the catalyst comprises:
(a) From 20 to 95% and preferably from 30 to 80%, and often more advantageously from 50 to 80% by weight of at least one matrix constituent A);
(b) From 1 to 70% and preferably 4 to 60%, and often more advantageously from 10 to 50% by weight of at least one zeolite of open structure other than a zeolite of the erionite family (constituent B); the term zeolite of open structure designates, in the present invention, a zeolite whose principal dodecagonal channel opening has a dimension such that it is equivalent to a circular opening having a diameter of at least 7 Angstroms ($7 \times 10^{-10}$ m);

(c) From 0.05 to 40% and preferably 0.1 to 30%, and often more advantageously from 0.5 to 10% by weight of at least one zeolite of the erionite family (offretite, ZSM 34 or erionite T for example) having a potassium content less than 4% in weight, total alkaline metals content preferably being less than 4% in weight (constituent C).

Constituent B is generally chosen from the group comprising X, Y, L, omega and beta zeolites. Zeolites having a faujasite structure are preferably used and, in particular, Y zeolites, preferably stabilized, commonly called ultrastable or USY, or enriched with silica such as zeolite LZ210 described in U.S. Pat. Nos. 4,403,023 and 4,534,853, EP. Nos. 139,291 and 124,120, either in a form at least partially exchanged with alkalino-earth metal cations and particularly with rare earth metal cations having an atomic number of 57 to 71 inclusive, or in hydrogen form.

The sum of the percentages by weight of constituents A, B and C contained in the catalysts is equal to 100% in each case. In the case where a zeolite of the erionite family is added to the principal catalyst in the form of spherical particles separate from the latter but with the same granulometry as the latter, the weight of the zeolite of the erionite family is between 1 and 90% (preferably between 5 and 60%) with respect to the weight of said particles other than those of the principal catalyst. Constituent A comprises at least one matrix generally chosen from the group comprising alumina, silica, magnesia, clay, titanium oxide, zircon, combinations of at least two of these compounds and alumina-boron oxide combinations.

Although all the zeolites of the erionite family, in particular offretite or ZSM34, are suitable for the present invention, it has been discovered that the most performing catalysts for the selective production of propylene contain offretites greatly enriched with silica.

Thus, constituent C of the catalyst according to the invention is preferably based on at least one offretite whose principal dodecagonal channel opening is less than $7 \times 10^{-10}$ m (7 Angströms), (constituent C) preferably having a $SiO_2/Al_2O_3$ molar ratio greater than about 15 and notably between 15 and 1000, preferably greater than 20 and more particularly between 30 and 500, $\vec{a}$ and $\vec{c}$ crystalline parameters of the elementary unit cell mesh of about 1.285 to 1.315 nm for $\vec{a}$ and about 0.748 to 0.757 nm for $\vec{c}$, and a potassium content less than 1.5% in weight and preferably less than 0.5%, total alkaline metal content preferably being less than 1.5% in weight.

These offretites preferably also have the following characteristics:
benzene adsorption capacity, at 25° C. and a partial pressure of 70 torr (9332 Pa), greater than 5 and preferably greater than 6% by weight,
water adsorption capacity, at 25° C. for a P/Po ratio of 0.1, less than 18% and preferably less than about 13% by weight,
preferably, existence of a secondary microporosity, measured with the BJH (Barret, Joyner, Halenda) method (defined in EP No. 190,949), situated between 3 and 5 nm and corresponding to about 5 to 50% of the total porous volume of the zeolite.

It is also obvious that the known process for modification of offretite can be applied to all offretite-erionite type structures, and in particular, to zeolite ZSM-34.

In the present invention, offretite can be used in hydrogen form, thus containing almost no metallic cations, apart from a very small quantity of alkaline metal cations (notably potassium) which are residual cations arising from synthesis of the zeolite. Offretite can also be used in a form at least partially exchanged by multivalent metallic cations. Some of the cationic sites of the alumino-silicate framework are thus occupied by these cations. Cations such as these are, for example, cations of alkalino-earth metals and preferably cations of rare earth metals with atomic numbers from 57 to 71 inclusive and especially lanthane. These cations are aimed at blocking the structural evolution of the particular offretite used, which may occur under the severe conditions in the regenerator of the industrial cracking unit.

The offretite used in the present invention is an offretite whose alumino-silicate framework comprises solely aluminum and silicon atoms. However, an offretite, such as that described hereinabove, in which some of the aluminum and/or silicon of the alumino-silicate framework is replaced, at the end of synthesis, by other elements, metals or metalloids such as B, P, Ti, V, Cr, Fe, Mn, Ga, Ge and Zr for example, can also be used.

The general conditions for catalytic cracking reactions are particularly well known and there is thus no need to repeat them within the scope of the present invention (see for example U.S. Pat. Nos. 3,293,192; 3,449,070; 4,415,438; 3,518,051; 3,607,043).

According to the invention, the catalyst described hereinabove is used together with injection of gasoline at a level above the charge under conditions such that this gasoline can be cracked a second time into lighter constituents ($C_3$, $C_4$). According to the invention, it has been observed that in order to efficiently crack this gasoline, it is convenient to send it to the lower part of the tubular, extended reaction zone, at a point lower than the point at which normal injection of the charge is carried out. In fact, temperature and C/O (catalyst to oil ratio) conditions in this zone are such that cracking is carried out under severe conditions. FIG. 1 represents a reaction zone 1 in extended tubular form (riser) with ascending circulation of the charge and catalyst (it is not necessary to go into more detail concerning the functioning of a dropper). The catalyst enters through pipe 2 at the base of the extended zone, the charge entering in the form of a liquid dispersed as fine droplets or in atomized form at the base of the riser but at a level B above the level at which the catalyst is admitted, by at least one opening 3. The catalyst enters the riser at a temperature $T_1$ and circulates at the base of this riser with a flow rate $D_1$. The charge enters the riser at a temperature $T_2$ and with a flow rate $D_2$. At the level of the charge inlet pipes 3, mixing of the charge and catalyst is carried out. A thermal exchange is produced between the charge and the catalyst, this exchange being seen from vaporization of at least some of the charge. An equilibrium is thus reached at a temperature $T_3$, higher than $T_2$, the charge-catalyst mixture circulating at this level of the riser with a flow rate $D_3$. The cracking reaction is thus produced and, as this reaction is endothermic, absorption of heat occur. At the upper part of the riser 1, separation of gaseous effluents of the reaction on one hand and catalyst particles on the other is performed, using a device 4 commonly called a "T" for example.

Thus, as explained hereinabove, injection of gasoline or LPG into the reactor 1 is carried out with at least one pipe 3a. Cracking of this light fraction is carried out under conditions of severity that are more favorable than if this injection had been carried out, for example, with only one pipe 3, essentially because it is around level C of pipe 3a that the temperature of the catalyst is hottest. Thus, at this level (C), the conditions for severe cracking (high temperature, high C/O) generally required for cracking of light charges (gasoline, LPG) exist locally. It is thus at level C that cracking of the gasoline injected in produced, leading to a decrease in the temperature of the catalyst at this level (C). In this way, the temperature is less at level B, the point at which the charge enters, allowing cracking under gentler conditions (moderate temperature, catalyst already amortized which are perfectly suited to cracking of the charge to obtain maximum L.C.O. Injection of gasoline into 3a is carried out at a temperature and under conditions which do not modify the temperature as the outlet of the reaction zone and which moreover lead to a more fluid circulation of the catalyst. In this way, two apparently incompatible objectives are reconciled by use of at least two zones of differing severity: on the one hand, a very severe first zone at the base of the riser, situated between the charge and gasoline entry points and where maximum production of L.P.G. occurs due to cracking of a gasoline lighter than the L.C.O. and, on the other hand, a less severe zone, situated in the riser above the charge entry pipe 3, the latter zone possibly, depending on the objective aimed at, subdivided itself into zones of differing severity, as the temperature decreases going up the riser.

The percentage of gasoline and/or L.P.G. injected above the charge, in compliance with the present invention, represents about 5 to 50% in volume of the charge and preferably, 10 to 30%.

The following examples illustrate the present invention without limiting the scope thereof.

EXAMPLE 1

Preparation of an offretite with a $SiO_2/Al_2O_3$ molar ratio equal to 25.

200 g of a synthetic offretite whose principal dodecagonal channel opening is $6.4 \times 10^{-10}$ m (W. Meier and D. H. Olson, Atlas of Zeolite Structure Types, 1978), with a $SiO_2/Al_2O_3$ molar ratio equal to 8 containing 9.9% in weight of potassium and 2.8% in weight of tetramethylammonium ions were calcined under dry air, at a flow rate of 3 l/h/g, for 2 hours at 550° C. in order to eliminate TMA+ ions.

The product obtained (reference 1A) was then exchanged three times by a 2M ammonium nitrate solution, with a solution volume to dry solid weight ratio (V/W) equal to 5, at 100° C. for 4 hours with stirring.

The solid obtained (reference 1B) contains 2.8% in weight of potassium and its $SiO_2/Al_2O_3$ molar ratio is 8. This solid 1B is called product 1. Its diffraction diagram is given in table 1. Its structural characteristics are given in table 2.

The principal dodecagonal channel opening of offretite was not modified by these processes.

TABLE 1

| X-ray diffraction diagram of product 1 |||||||
|---|---|---|---|---|---|
| 2 theta | d (nm) | Intensity | 2 theta | d (nm) | Intensity |
| 7.70 | 1.145 | 66 | 28.10 | 0.317 | 10 |
| 11.75 | 0.752 | 7 | 28.40 | 0.314 | 24 |
| 13.40 | 0.661 | 37 | 30.55 | 0.292 | 5 |
| 14.10 | 0.268 | 7 | 31.25 | 0.286 | 62 |
| 15.50 | 0.572 | 18 | 31.50 | 0.284 | 59 |
| 17.85 | 0.496 | 2 | 33.50 | 0.267 | 24 |
| 19.50 | 0.455 | 26 | | | |
| 20.50 | 0.433 | 54 | | | |
| 23.31 | 0.382 | 31 | | | |
| 23.70 | 0.375 | 100 | | | |
| 24.90 | 0.357 | 66 | | | |
| 26.20 | 0.340 | 1 | | | |
| 27.00 | 0.330 | 23 | | | |
| 27.30 | 0.327 | 7 | | | |

The following procedures are carried out on the offretite obtained above (product 1) containing 2.8% in weight of potassium:

First cycle

Self-steaming at 550° C. for 2 hours (product 2A is obtained), 2 successive cationic exchanges with 2M $NH_4NO_3$ under the conditions described in example 1 (product 2B is obtained).

Second cycle

Self-steaming at 650° C. for 2 hours (product 2C is obtained), cationic exchange with 2M $NH_4NO_3$ under the conditions described in example 1 (product 2D is obtained), 2 successive acid attacks with 0.23N HCl followed by 0.36N HCl at 100° C. for 4 hours, with a V/W ratio equal to 10 (product 2E is obtained after the first acid attack and product 2F after the second acid attack).

TABLE 2

| | 1 | 2A | 2B | 2C | 2D | 2E 10 | 2F 25 |
|---|---|---|---|---|---|---|---|
| $SiO_2/Al_2O_3$(mol) | 8 | | | | | | |
| S lines ($10^3$) | 277 | 303 | 323 | 298 | 274 | 290.5 | 285 |
| S base ($10^3$) | 203 | 193 | 209 | 240 | 256.5 | 269 | 256 |
| S lines (%) | 58 | 61 | 61 | 55 | 52 | 52 | 53 |
| Total S Crystallinity (%) | 100 | 105 | 105 | 95 | 90 | 90 | 91 |
| Parameters a | 13.22 | 13.10 | 13.16 | 13.02 | 13.02 | 13.01 | 13.03 |
| c (Angstroms) | 7.52 | 7.50 | 7.51 | 7.51 | 7.51 | 7.51 | 7.52 |

(1 Angstrom = $10^{-10}$ m).

At the end of these various treatments, the crystallinity of product 2F remains excellent (its structural characteristics and diffraction diagram are given in tables 2 and 3). Its potassium content is 0.7% in weight, its $SiO_2/Al_2O_3$ molar ratio is equal to 25 and its water adsorption capacity is 15% (P/Po=0.1). The solid 2F is called product 2.

TABLE 3

| X-ray diffraction diagram of product 2 ||||||
|---|---|---|---|---|---|
| 2 theta | d (nm) | Intensity | 2 theta | d (nm) | Intensity |
| 7.85 | 1.13 | 80 | 24.0 | 0.371 | 44 |
| 11.80 | 0.751 | 7 | 24.95 | 0.356 | 47 |
| 13.60 | 0.650 | 100 | 27.40 | 0.325 | 27 |
| 14.15 | 0.625 | 43 | 28.50 | 0.313 | 20 |
| 15.70 | 0.564 | 33 | 30.95 | 0.289 | 14 |
| 18.00 | 0.492 | 2 | 31.70 | 0.282 | 71 |
| 19.70 | 0.451 | 16 | 33.90 | 0.264 | 22 |
| 20.85 | 0.426 | 57 | | | |

TABLE 3-continued

| X-ray diffraction diagram of product 2 | | | | | |
|---|---|---|---|---|---|
| 2 theta | d (nm) | Intensity | 2 theta | d (nm) | Intensity |
| 23.70 | 0.375 | 29 | | | |

EXAMPLE 2

Preparation of a cracking catalyst based on the offretite prepared in example 1.

In a 20-liter container equipped with a stirrer, 14 liters of water, 600 g of dry pseudoboehemite gel (marketed by CONDEA and containing about 75% in weight of alumina) and about 2.5 kgs of a silica-alumina calcined and ground to an average particle size of 6 microns are introduced. 160 cm$^3$ of pure concentrated nitric acid are added to the previous mixture, stirred continuously, which is then heated at 50° C. for 45 minutes and stirred continuously. 740 g of the offretite from example 1 called "product 2" are then added and stirring is continued for 15 minutes. The mixture is then atomized in a NIRO atomizer, at an entry temperature of 380° C. and an exit temperature of 140° C.

The finished catalyst is in the form of microspheres with a granulometry comparable to that of commercial fluid cracking catalysts. It contains 20% in weight of offretite with respect to the dry product.

A catalyst such as this is usually previously calcined for 16 hours at 750° C. under an atmosphere consisting of 100% water vapor before being used for cracking.

EXAMPLE 3

(does not comply with the invention) carried out without injection of gasoline then with injection of light gasoline at the base of the riser.

Two catalytic cracking tests were carried out on a hydrocarbon charge. The catalyst contains 70% of a conventional matrix based on silica alumina rich in silica and on kaolin and contains 30% of an ultrastable USY zeolite Y. The equilibrated catalyst circulating in the unit has the following characteristics:

surface in m$^2$.g$^{-1}$ = 110
rare earth oxides in % weight = 1.6
Na$_2$O% weight = 0.3
V (ppm) = 4800
Ni (ppm) = 2800
Fe (ppm) = 10200.

In the first test, a conventional device is used to inject catalyst grains through a pipe 2 (FIG. 1) and the heavy charge to be cracked through a pipe 3. The second test was carried out using the device described in the invention, comprising injection by a pipe 3a of 25% in weight of gasoline with respect to the gasoline charge. Nonetheless, this example does not comply with the invention as the catalyst specific to the invention is not used here. The heavy charge common to both tests has the characteristics indicated below:

CHARACTERISTICS OF THE HEAVY CHARGE USED

| Density (20° C.) | 0.968 |
|---|---|
| Viscosity (solid at 60° C.) (80° C.) | 119.8 |
| cSt (100° C.) | 52.2 (52.2 mm$^2$/S) |
| Conradson % weight | 5.1 |
| Na ppm | 2 |
| Ni ppm | 12 |

| | |
|---|---|
| V ppm | 1 |
| C % weight | 86.9 |
| H % weight | 12.2 |
| N % weight | 0.35 |
| S % weight | 0.21 |
| Basic N % weight | 0.055 |
| Aromatic C % weight | 22.3 |
| Aromatic H % weight | 2.7 |
| Simulated distillation (°C.) | |
| 5% weight | 367 |
| 10% weight | 399 |
| 20% weight | 436 |
| 40% weight | 495 |
| 60% weight | 575 |
| FBP | 575 |

The straight-run gasoline used in the second test is a 50°–160° C. nonolefinic cut with the following composition:

| paraffins % weight: | 58 |
|---|---|
| olefins % weight: | 0 |
| naphthenes % weight: | 29.5 |
| aromatics % weight: | 12.5 |

This gasoline contains less than 2% in weight of compounds with 5 carbon atoms.

During the course of these two tests, operating conditions were as follows:

| temperature of catalyst injection (°C.) | 771° C. |
|---|---|
| temperature of heavy charge injection (°C.) | 210° C. |
| temperature of the riser in the vicinity of pipe 3 (°C.) | 537° C. |
| temperature at the top of the riser (°C.) | 520° C. |
| C/O = 6, in which C is the catalyst mass flow rate and O is the heavy charge mass flow rate. | |

The results obtained in the two tests are given in table 4 below. Yields are expressed in % weight with respect to the heavy charge. The conversion of the gasoline injected in the second test is 56% weight.

TABLE 4

| | 1st test (heavy charge) (% weight) | 2nd test (heavy charge + straight-run gasoline) (% weight) |
|---|---|---|
| H$_2$S | 0.10 | 0.10 |
| H$_2$ + C$_1$ + C$_2$ | 4.6 | 5.5 |
| C$_3$ | 1.4 | 2.1 |
| C$_3$= | 4.4 | 6.5 |
| saturated C$_4$ | 4.1 | 5.1 |
| (of which iC$_4$) | (3.3) | (4.1) |
| total C$_4$= | 5.9 | 9.3 |
| Total in gases | 20.5 | 32.70 |
| Gasoline (C$_5$-221° C.) | 44.9 | 60.0 |
| LCO (221-350° C.) | 15.1 | 15.8 |
| Slurry (350+) | 11.4 | 12.2 |
| Coke | 8.1 | 8.5 |
| Conversion | 73.5 | — |
| Total | 100 | 125 |
| Gasoline Research octane number | 92.2 | 90.9 |
| Gasoline Motor octane number | 80.1 | 79.5 |

The system based on injection at the base of the riser of straight-run gasoline onto a very hot catalyst allows an improved yield in propylene to be obtained, as well as an improved yield in olefins with 4 carbon atoms.

EXAMPLE 4

(complies with the invention): Cracking process characterized by injection of straight-run gasoline at the base of the riser and use of a catalyst containing an offretite.

To the fluid cracking catalyst used in example 3, 20% in weight of the catalyst complying with the invention, prepared in example 2, containing 20% in weight of offretite is added. There is thus 4% in weight of offretite with respect to the total catalytic mass.

The catalytic tests were carried out under the conditions described in example 3, the C/O ratio=6 being defined as the ratio of equilibrated catalyst flow rate (in example 3) to heavy charge flow rate whose characteristics were given in example 3.

The following table n° 5) gives the results obtained. The results obtained in example 3 (when there is injection of gasoline) are recalled in this table.

It appears that addition of the zeolite offretite to a conventional catalyst leads to an appreciable gain in propylene, with a slilght appreciable gain in unsaturated C4 hydrocarbons.

TABLE 5

|  | Test with injection of a gasoline and conventional catalyst (% weight) | Test with injection of a gasoline and catalyst complying with the injection (% weight) |
|---|---|---|
| $H_2S$ | 0.1 | 0.1 |
| $H_1 + C_1 + C_2$ | 5.5 | 6.4 |
| $C_3$ | 2.1 | 3.0 |
| $C_3=$ | 6.5 | 10.3 |
| saturated $C_4$ | 5.1 | 6.1 |
| (of which $iC_4$) | (4.1) | (4.9) |
| total $C_4=$ | 9.3 | 12.7 |
| Total in gases | 28.5 | 38.6 |
| Gasoline ($C_5$-221° C.) | 60.0 | 52.8 |
| LCO (221-350° C.) | 15.8 | 13.9 |
| Slurry (350+) | 12.2 | 11.0 |
| Coke | 8.5 | 8.7 |
| Total | 125.0 | 125.0 |
| Gasoline Research octane number | 90.9 | 93.7 |
| Gasoline Motor octane number | 79.5 | 82.2 |

What is claimed is:

1. A fluid catalytic cracking process for a hydrocarbon charge, in an extended tubular essentially vertical zone, catalyst particles being introduced at one end of the extended zone, a charge being introduced into the extended zone at a level B downstream from the level at which catalytic particles are admitted, whereby cracking of the charge takes place, said catalytic particles being separated from the reaction effluent at the other end of the extended zone, the reaction effluent then being fractionated to obtain fractions comprising liquefied petroleum gas, a gasoline, a light cycle oil, and a heavy cycle oil, wherein in said process a gasoline is injected into the extended zone at an intermediate level C between the level at which catalytic particles are admitted and the level B at which the charge is admitted, said gasoline representing 5 to 50% by volume of the charge, whereby cracking of the gasoline takes place; and said catalyst particles are comprised of by weight:
   (a) 20 to 95% of a matrix,
   (b) 1 to 70% of a zeolite with an open structure other than a zeolite of the erionite family, and
   (c) 0.05 to 40% of a zeolite of the erionite family selected from the group consisting of erionite, offretite, ZSM-34, erionite T and their mixtures, having a potassium content less than 4% by weight.

2. A process according to claim 1, wherein said zeolite (b) having an open structure has a principal dodecagonal channel opening of at least 7 Å.

3. A process according to claim 1, wherein said catalyst contains by weight:
   (a) 30 to 80% of said matrix,
   (b) 4 to 60% of said zeolite with an open structure, and
   (c) 0.1 to 30% of said zeolite of the erionite family.

4. A process according to claim 3, wherein said offretite has the following characteristics:
   $SiO_2/Al_2O_3$ molar ratio greater than about 15,
   $\vec{a}$ and $\vec{c}$ crystalline parameters respectively:
     between about 1.285 and about 1.315 nm for $\vec{a}$,
     between about 0.748 and about 0.757 nm for $\vec{c}$, and
   potassium content less than 1.5% by weight.

5. A process according to claim 4, wherein said offretite had the following characteristics:
   benzene adsorption capacity, at 25° C. and a partial pressure of 70 torr (9332 Pa), greater than 5% by weight,
   water adsorption capacity, at 25° C. for a P/Po ratio of 0.1, less than 18% by weight where P is the measured nitrogen partial pressure and Po is the nitrogen saturation vapor pressure at the measurement temperature,
   optionally, a secondary microporosity, measured with the Barret, Joyner, Halenda method, between 3 and 5 nm and corresponding to about 5 to 50% of the total porous volume of the zeolite.

6. A process according to claim 1, wherein said catalyst is used in admixture with a conventional cracking catalyst.

7. A process according to claim 1, wherein the catalyst contains at least 20% by weight of zeolite (c).

* * * * *